May 4, 1948.  M. M. CUNNINGHAM  2,441,009
TANK FITTING
Filed July 4, 1945
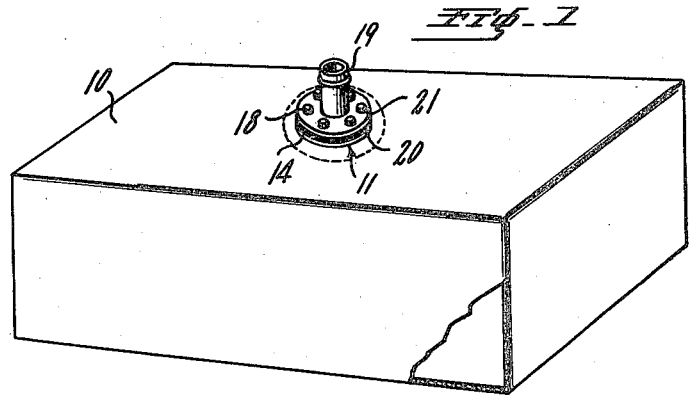
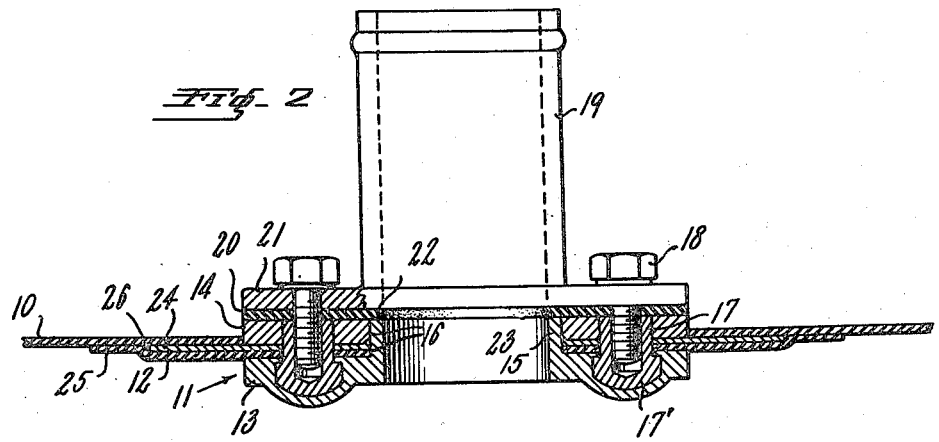
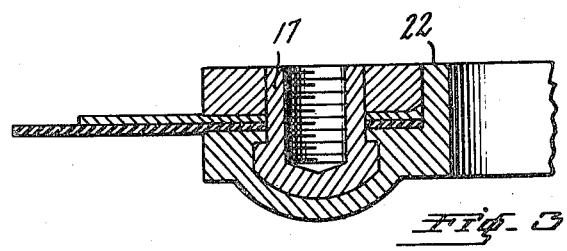
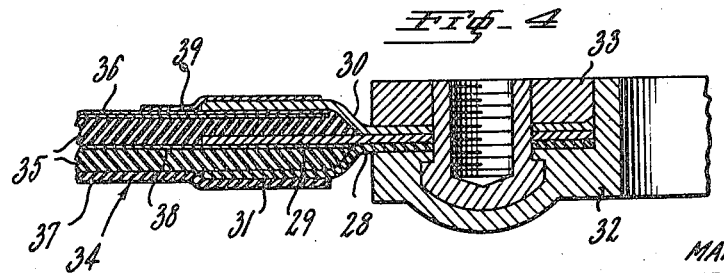
INVENTOR
MARION M. CUNNINGHAM
BY
ATTORNEY Patented May 4, 1948

2,441,009

UNITED STATES PATENT OFFICE 2,441,009

TANK FITTING

Marion M. Cunningham, South Bend, Ind., assignor to United States Rubber Company, New York, N. Y., a corporation of New Jersey Application July 4, 1945, Serial No. 603,217

4 Claims. (Cl. 285—38)

This invention relates to a tank fitting for providing an opening in a wall of the tank to which may be attached an inlet or an outlet connection, or a closure therefor. The fitting is particularly applicable to a tank having flexible walls which require a flexible flange reinforced with textile fabric for connecting the fitting to the tank wall, and it is an improvement over the fitting disclosed in my prior Patent No. 2,366,442, granted January 2, 1945.

It is the usual practice to reinforce the walls of flexible tanks with one or more layers of a textile fabric which is coated or impregnated with a rubber composition, or rubber like material to render its surfaces impervious to the liquid contents to be deposited in the finished tank. The fitting is attached to the walls of the tank by means of a fabric reinforced disc like ring or flange which has been similarly treated to render it impervious to liquids, and so that it may be bonded to the tank wall. The tank wall is cut to form an opening therein for the fitting and the fabric reinforced flange is also cut to the proper shape. In order to protect the rubber treated fabric from being disintegrated by some liquids which may be contained in the tank, it is necessary to prevent the cut edges of the textile fabric of the tank wall opening and of the tank fitting from coming in contact with the contents of the tank and absorbing the liquid by wick action into the rubber treated fabric. In my prior patent, the cut edge forming the inner periphery of the fabric flange was protected by a layer of rubber which covered the entire inner periphery of the fitting and extended over its top and bottom surfaces. In that construction it was necessary to mold the rubber in place which is more expensive and utilizes more rubber than my present fitting.

In accordance with my present invention a reduction in the weight of materials is effected, and the molded layer of rubber in the prior construction is eliminated in the manufacture of the fitting by sealing the inner periphery of the edges of the fabric flange in a case formed by the metal parts of the fitting.

The present invention has as a further object an improved construction for facilitating the assembly of the metal parts in tight engagement with the treated fabric flange, which eventually forms a part of the tank wall, or in tight engagement with the margin of an opening in the tank wall.

The foregoing and other objects of this invention will be more clearly understood by referring to the following description and the accompanying drawings, in which:

Fig. 1 is a perspective view of a tank having a fitting embodying this invention applied thereto;

Fig. 2 is a vertical section of the fitting shown in Fig. 1 and having an inlet connection attached thereto;

Fig. 3 is an enlarged view of a portion of the fitting shown in Fig. 2; and

Fig. 4 is an enlarged cross sectional view of the tank fitting, illustrating its application to a fuel tank having a wall construction adapted to seal bullet holes.

Fig. 1 discloses a tank 10 having a fitting 11 embodying this invention connected thereto. The details of the fitting 11, and the manner in which it is connected to the wall of the tank 10, is shown in Fig. 2. As illustrated herein the walls of the tank 10 are made of flexible rubberized fabric, and the fitting 11 is provided with a flange 12 comprising one or more layers of fabric and rubber which are united to the wall of the tank 10, preferably with a vulcanized bond. The flange 12 is clamped between a rigid base ring 13 and a second rigid outer ring 14. The base ring 13 is provided with an axially extending internal flange 15, which projects within the central openings, or inner peripheries 16, of the flexible connecting flange 12 and the outer ring 14 for the purpose of sealing the cut edge of the inner periphery of the flange 12 from the liquid contents of the tank 10.

The base ring 13 is provided with a plurality of projections or domed nuts 17 which are internally threaded to receive cap screws 18 for securing to the fitting 11 an element 19, which may be an inlet or an outlet connection, or a cover plate. A gasket 20 having the characteristic of not absorbing the liquid contents of the tank 10 is interposed between a flange 21 on the element 19 and the outer fitting ring 14 for the purpose of sealing the connection between the element 19 and the fitting.

When the cap screws 18 are tightened, a liquid tight seal is formed between a seat 22 on the end of the axially extending flange 15 and the gasket 20, so that liquid cannot seep from the throat 23 of the flange 23 past the seat 22 and down the outer periphery of the flange 15 to the inner periphery of the opening 16 in the fabric reinforced flange 12, where the cut edges of the textile fabric is not securely protected by a liquid repellent rubber covering. The gasket 20 also forms a seal with the bottom surface of the flange 21 on the element 19. It will be noted by that construction the cooperation between the gasket 20 and the seat 22 further protects the edges of the textile fabric in the event the joints between the ring 14 and the flange 15 and projections 17 are not leak proof.

In cases where a heavy fitting is undesirable, the base ring 13 and the outer ring 14 are made of light metal, such as aluminum, or an aluminum alloy. These lighter metals are not suitable for forming a strong threaded connection. Therefore the internally threaded projections 17 are desirably made of a harder and stronger metal. In such construction the projections 17 are preformed with a base 17', and the base ring 13 is cast around them, whereby they are retained in the ring in the nature of inserts.

The assembly of the fitting 11 before it is united to the wall of the tank 10 will now be described. The flexible flange 12 is made of two layers of material which are cut in the form of concentric discs 24 and 25. The disc 24 is made of unvulcanized rubber treated fabric, and is smaller than the unvulcanized rubber collar 25 to which it is adhered. The central opening 16 is formed in the assembled flange 12 to correspond with the outer diameter of the flange 15, and other openings are formed therein to correspond with the outer diameter of the projections 17 on the base ring 13. The flange 12 including the portion which extends between the rings 13 and 14, is coated with rubber cement. The flange is then assembled on the base ring 13 so that the openings formed therein properly match with the flange 15 and the projections 17. The projections 17 are preferably provided with longitudinally or axially extending serrations, and the outer ring 14 is provided with openings adapted to fit over the serrated projections 17 and around the flange 15 with a pressed fit. The rings are assembled in matching relation and pressed together so that the flexible flange 12 is tightly clamped therebetween. The rubber cement on the flange 12 assists in bonding it to the rings 13 and 14 and in sealing the joints between the ring 14 and the flange 15 and the projections 17.

The fitting thus assembled is then applied to the opening in the tank wall in the usual manner by vulcanizing it to the rubberized fabric 10 of the tank wall. At the same time the rubber of the flange 12 is also vulcanized. The inner rubber layer 25 extends over the outer periphery of the rubberized fabric layer 24 and is vulcanized to the tank wall. The cut fabric outer periphery 26 is thereby protected from exposure to the liquid contents of the tank.

The fitting previously described, and embodying this invention, is also applicable to fuel tanks of the type used in military aircraft in which the walls of the tank are so constructed that punctures produced by bullets are self-sealed. Such an application is illustrated in Fig. 4 where the fabric reinforced flange 28 to be connected to the tank wall is made of a slightly different construction, and its union with the wall is also different, but otherwise the fitting is the same as the one previously described. The flange 28 comprises an intermediate layer 29 of fabric treated with unvulcanized rubber which is sandwiched between an outside layer of fabric 30 and an inside layer of rubber 31, the inner periphery of the flange being clamped between a base ring 32 and an outer ring 33.

The layers of the flange 28 are not bonded together in the area outside of the rings 32 and 33 so that they can advantageously be disposed in the joint between the flange and the tank wall 34, forming the bullet hole sealing construction. The wall 34 of the tank comprises two layers 35 of a sealant, which may be either an artificial or natural rubber composition and is usually vulcanized slightly to prevent the rubber from completely disintegrating in gasoline, but not to a point where it will not swell readily. The outer layer 35 is adhered to a fabric covering 36, preferably of the two ply tire cord type, and it extends all around the tank wall to give it mechanical strength. The inner layer of the sealant 35 is adhered preferably to a synthetic rubber layer 37 which is chemically resistant to the liquid contents of the tank and is adapted to protect the sealant therefrom. A layer 38 of fabric of the tire cord type is interposed between the layers 35 and is adhered thereto.

Before arranging the layers of material of the tank wall 34 and the flange 28 in the joint as shown in Fig. 4, all of the overlapping surfaces of the joint layers are coated with a vulcanizable cement. After the layers are firmly adhered together a ring 39 of reinforcing fabric is adhered over the edge of the outer periphery of the outer fabric layer 30 of the flange 28. After the joint has been assembled it is vulcanized in the usual manner to securely unite the adjacent layers. The direct union between the fabric layers of the wall 34 and flange 28 gives the joint mechanical strength.

While the tank fitting embodying this invention has been described more or less in detail, it will be understood that changes may be made therein without departing from the scope of the appended claims and the spirit of the invention.

Having thus described my invention, what I claim and desire to protect by Letters Patent is:

1. In a tank fitting having an opening therein adapted to have an element attached thereto in sealed relation, a base ring having an axially projecting flange extending around its inner periphery, said base ring having internally threaded projections extending from the face of said ring, a member adapted to be secured to a wall of said tank, said member surrounding said flange and having openings fitted over said projections, a second ring having openings therein and an inner periphery press fitted, respectively, over said projections and said flange to clamp said member between said rings.

2. In a tank fitting having an opening therein adapted to have an element attached thereto in sealed relation, a base ring having an axially projecting flange extending around its inner periphery, said base ring being formed of cast metal and having preformed harder internally threaded projections anchored therein and extending from the face thereof, a flexible rubber treated fabric member adapted to be joined to a wall of said tank, said member surrounding said flange and having openings into which said projections are fitted, a second ring having openings therein and an inner periphery press fitted respectively around said projections and said flange to clamp said flexible member therebetween.

3. In a fuel tank fitting having an opening therein adapted to have an element attached thereto in sealed relation, a base ring having an axially projecting flange extending around its inner periphery, said base ring having internally threaded projections extending from and anchored below the face of said ring, a flexible rubber treated fabric member adapted to be secured to the wall of said tank, said flange and projections extending, respectively into openings in said flexible member, a second member having openings therein and an inner periphery press fitted, respectively around said projections and said flange to clamp said member between said rings, a seat on the end of said flange, a gasket fitted over said second ring and said seat, and bolts anchored in said threaded projections to hold said element on said fitting and form a seal between said gasket and the cooperating elements.

4. A tank fitting having a vulcanized connection with the tank wall, said fitting comprising a base ring having an axially projecting flange extending around its inner periphery, a disk of rubberized fabric extending over the outer periphery of said base ring and having an opening therein into which said flange projects, a second ring surrounding said flange and cooperating with said first ring to clamp said disk therebetween and hold said parts together, said tank wall comprising outer and inner layers of rubberized textile fabric, said disk having outer and inner layers of rubberized textile fabric placed adjacent to said textile layers in said tank wall and vulcanized in situ thereto.

MARION M. CUNNINGHAM.

REFERENCES CITED

The following references are of record in the file of this patent:

UNITED STATES PATENTS

| Number | Name | Date |
|---|---|---|
| 2,336,885 | Pepersack | Dec. 14, 1943 |
| 2,370,799 | Kelley | Mar. 6, 1945 |
| 2,391,373 | Wickstrum | Dec. 18, 1945 |

FOREIGN PATENTS

| Number | Country | Date |
|---|---|---|
| 593,400 | France | Feb. 14, 1925 |